UNITED STATES PATENT OFFICE.

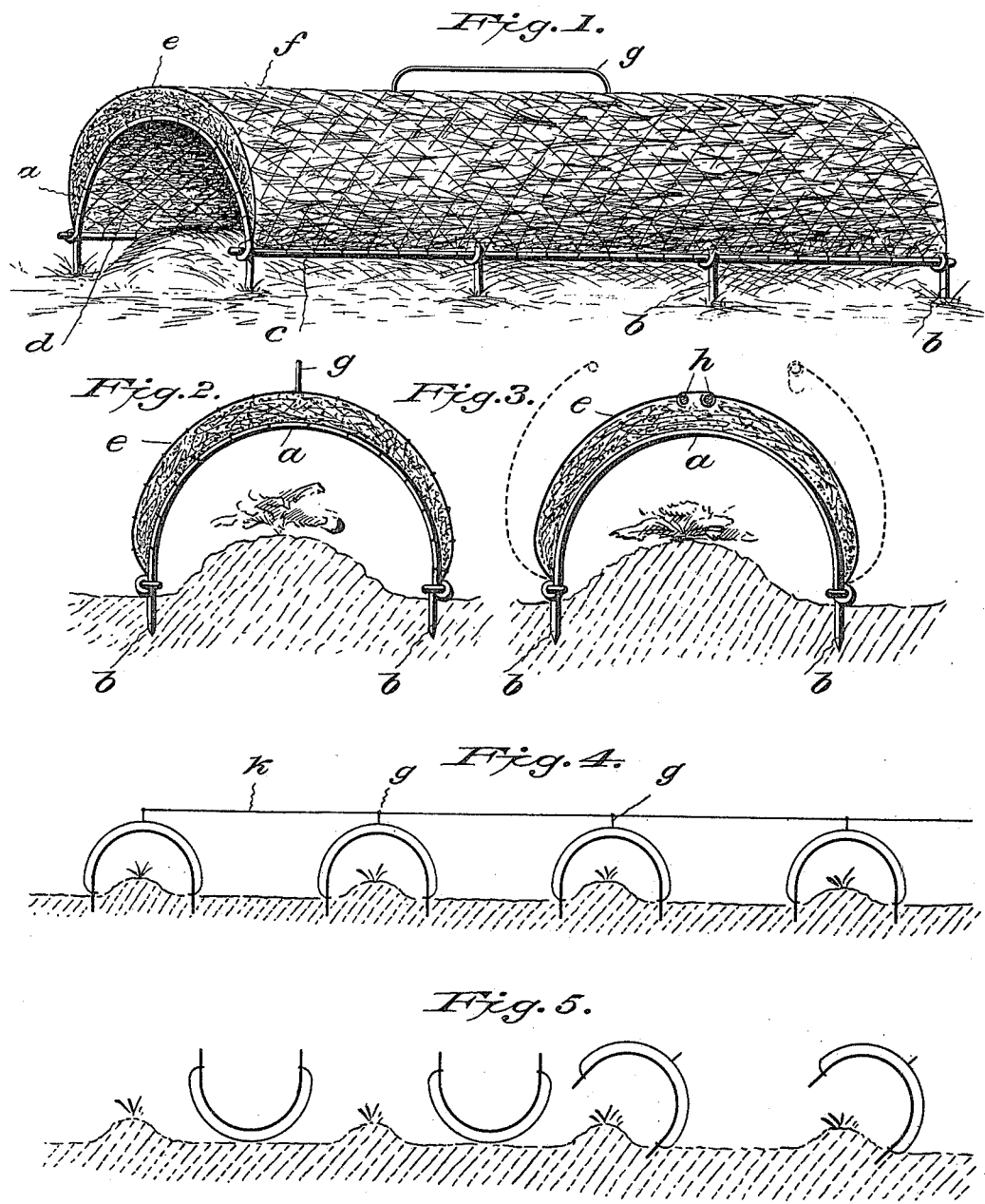

LEONARD J. MERRIMAN, OF IVANHOE, NORTH CAROLINA.

PLANT-PROTECTOR.

SPECIFICATION forming part of Letters Patent No. 617,034, dated January 3, 1899.

Application filed May 28, 1898. Serial No. 682,040. (No model.)

*To all whom it may concern:*

Be it known that I, LEONARD J. MERRIMAN, a citizen of the United States, residing at Ivanhoe, in the county of Sampson and State of North Carolina, have invented a certain new and useful Improvement in Plant-Protectors, of which the following is a full, clear, and exact description.

Among the truck-farmers in the pine regions of North Carolina it is common practice to take the pine-needles, or, as they are locally called, the "pine-straw," and cover strawberry-beds, so as to protect the plants against the injurious action of the elements, especially frost. This pine-straw is strewn over the plants by hand-rakes at considerable expense in time and labor and must be similarly removed when danger is passed; but this pine-straw is most efficient for protecting the plants not only from frost, but from cold rains, snow, and the sun, and as it is to be had simply at the cost of the labor of gathering it is utilized very economically. My invention is designed primarily to utilize this pine-straw less laboriously than under the old practice; and to this end it consists in a wire frame which is padded with the pine-straw and which is capable of being very readily and economically applied to growing vegetation when in danger from the elements and as readily removed when the danger is passed.

Of course I do not limit my invention to the use of pine-straw, but include any suitable packing material, natural or manufactured, which will serve as a protection against frost, rain, snow, and other agencies of a nature detrimental to growing plants. I may use the leaves of trees or plants, wheat and other straw, cotton or other cloth, and other natural or manufactured substances; but I prefer to use such a substance or material as will repel rain and snow as well as protect the plants against frost.

With this general statement I will proceed now to describe my invention as applied to and in connection with pine-straw or pine-needles.

In the accompanying drawings, illustrating my invention, in the several views of which like parts are similarly designated, Figure 1 is a perspective view of one form of my plant-protector. Fig. 2 is a cross-section. Fig. 3 is a cross-section showing a modification. Fig. 4 is an illustration of one way of arranging a series of the protectors so as to provide for simultaneously uncovering or covering a number of beds or rows of plants. Fig. 5 illustrates various positions of the protector.

I prefer to construct a frame in arch form and composed, essentially, of arched wires $a$, whose ends $b$ may be pointed, as shown in Fig. 2, so as to be readily driven or to sink into the soil. These arch-bars are provided with stringer-rods $c$, preferably rigidly interlocked with the arch-bars, as by bending. The foundation $d$, of woven wire, such as poultry-netting, is secured to the arch-bars and the stringers in any suitable manner. A cover-frame, preferably composed of arch-bars $e$ and woven-wire or poultry netting $f$, applied thereto, is secured to one of the stringers along one edge, and this cover-frame is of larger diameter than the diameter of the foundation, so as to leave a space between the foundation and the cover-frame. The cover-frame being turned back, a layer of pine-needles or pine-straw or other protective substance or material is then laid upon the foundation, and when a sufficient thickness is secured the cover-frame is turned down over it and its other edge firmly secured to the other stringer. A bail or handle $g$, of wire, is applied to the cover-frame for convenience in carrying the protector. In this way a light portable protector is provided, which has been found very economical and very efficient in the protection of strawberry-plants from the elements.

Instead of making the cover-frame of one piece, as in Figs. 1 and 2, it may be divided longitudinally, as shown in Fig. 3, and one or both of its edges may be provided with stiffening wires or rods $h$, the halves of the cover-frame being connected by any suitable hooks $i$ or other fastenings.

Other modifications in the structure are within the principle of my invention, which comprises a foundation-frame and a cover-frame, between which a space is left to receive padding or other plant-protecting medium.

Inasmuch as it is often necessary to protect growing plants at very short notice it is possible with my invention to lay the protectors between the rows of plants and to connect them with a cord or rope, as at k, Fig. 4, so that a number of the protectors may be pulled over the plants very quickly at the time of threatened danger, and thereafter similarly removed therefrom after danger is past.

If the protectors are not required, they may be turned bottom side up, as at the left of Fig. 5, and laid between the rows of plants and serve as a wind-break. Another capacity of my protector is the ability to tilt it up sidewise, so as to uncover the rows of plants on one side to expose them to the sun and protect them against the wind, or to protect them against the sun while giving them air, as at the right in Fig. 5.

Not only is my protector adapted to shield the plants against frost, snow, and rain, but obviously it may be used as a shelter against the sun in the event of drought. By the old plan of covering the plants with loose material and raking it off the plants were liable to have their blooms, leaves, and fruit damaged; but my protector obviates such injury.

The protector may be elevated from the level of the earth, as in Fig. 1, when it is desired that the air shall circulate beneath the protector, or the protector may be driven into the earth until its stringers rest upon the surface, so as to provide against undue evaporation and also so as to provide against the admission of air.

The protectors may be arranged end for end, or the ends may be closed up by piling pine-straw or other available trash or other material at or in said ends, or said ends may be provided with curtains or flaps of fabric or other material or be otherwise closed.

I do not limit my invention to the semicircular shape, but prefer that shape or other arch shape; also, the legs b may be used or dispensed with as necessary. The top of the foundation arch-frame may be strengthened by longitudinal rods or wires to prevent sagging, and in this case the covers may not be supplied with the longitudinal wires, but may be hooked to one another or to the frame. These and other modifications are within the scope of my invention.

At the end of the season when the protectors are no longer needed they may be piled up under shelter, if desired, and used over and over again, and obviously the padding or filling may be renewed so long as the wire frames are intact.

What I claim is—

1. A plant-protector, composed of an arched foundation-frame having a foundation of woven wire, a reticulated cover-frame of larger diameter, and a suitably-interposed padding or filling, adapted to shield or protect growing plants from injury, substantially as described.

2. A plant-protector, composed of an arched foundation-frame, having a woven-wire or metallic foundation upon which rests a padding or filling of loose material, and a reticulated cover-frame laid over such padding or filling and secured to the foundation-frame, substantially as described.

3. A plant-protector, composed of arch-bars and stringers firmly connected, a reticulated foundation secured to the arch-bars and stringers, and a reticulated cover-frame hinged in place and adapted to be secured over a padding or filling interposed between the foundation and the said cover-frame to hold the said padding or filling in place, substantially as described.

4. A plant-protector, composed of a foundation consisting of arch-bars, stringers connected therewith and a reticulated foundation-piece supported by the arch-bars and stringers, and a reticulated cover-frame divided longitudinally and hinged to the stringers and adapted to be united over a padding or filling interposed between the foundation-piece and the said cover, substantially as described.

5. A plant-protector, having an arched net-foundation, a divided cover-frame hinged to such foundation, either or both of the adjacent edges of the cover-frame being provided with a longitudinal reinforcing rod or bar, and hooks or other fastenings to connect such adjacent edges of the cover-frame, substantially as described.

In testimony whereof I have hereunto set my hand this 3d day of May, A. D. 1898.

LEONARD J. MERRIMAN.

Witnesses:
FRANCIS W. JUDGE, Jr.,
WM. MECKLEM.